US005726693A

United States Patent [19]

Sharma et al.

[11] Patent Number: 5,726,693

[45] Date of Patent: Mar. 10, 1998

[54] INK PRINTING APPARATUS USING INK SURFACTANTS

[75] Inventors: Ravi Sharma, Fairport; Gilbert Allan Hawkins, Mendon; Pranab Bagchi, Webster; David Lee Clark, Pittsford, all of N.Y.

[73] Assignee: Eastman Kodak Company, Rochester, N.Y.

[21] Appl. No.: 681,233

[22] Filed: Jul. 22, 1996

[51] Int. Cl.[6] .......................... G01D 15/18; G01D 15/16

[52] U.S. Cl. ................................ 347/48; 347/54; 347/55; 347/15; 346/140 R

[58] Field of Search ................................ 347/54, 48, 55, 347/15, 44; 106/22, 266, 20 B; 428/411.1, 195; 523/161; 346/140 R

[56] References Cited

U.S. PATENT DOCUMENTS

| | | | |
|---|---|---|---|
| 3,946,398 | 3/1976 | Kyser et al. . | |
| 4,164,745 | 8/1979 | Cielo et al. . | |
| 4,166,277 | 8/1979 | Cielo et al. . | |
| 4,275,290 | 6/1981 | Cielo et al. | 219/216 |
| 4,293,865 | 10/1981 | Jinnai et al. . | |
| 4,424,520 | 1/1984 | Matsuda et al. | 346/140 R |
| 4,490,728 | 12/1984 | Vaught et al. . | |
| 4,737,803 | 4/1988 | Fujimura et al. . | |
| 4,748,458 | 5/1988 | Inoue et al. . | |
| 4,751,531 | 6/1988 | Saito et al. . | |
| 5,023,625 | 6/1991 | Bares et al. | 346/140 R |

FOREIGN PATENT DOCUMENTS 2 007 162 10/1978 United Kingdom .

*Primary Examiner*—Peter S. Wong
*Assistant Examiner*—Rajnikant B. Patel
*Attorney, Agent, or Firm*—Milton S. Sales

[57] ABSTRACT

A liquid ink, drop-on-demand pagewidth printhead including a semiconductor substrate, a plurality of drop-emitter nozzles fabricated on the substrate; an ink supply manifold coupled to the nozzles; pressure element for subjecting ink in the manifold to a pressure above ambient pressure; a drop selection device for selectively addressing predetermined nozzles, and drop separation device to transfer ink selected drops from selected nozzles to a print region. A surface tension reducing agent for each nozzle is provided from a supply separate from the ink and integrated into the printhead. An increase in ink drop protrusion from the nozzle surface differentiates selected drops from non-selected drops.

16 Claims, 9 Drawing Sheets

INK PRINTING APPARATUS USING INK SURFACTANTS

CROSS-REFERENCE TO RELATED APPLICATIONS

Reference is made to Commonly assigned U.S. patent application Ser. No. 08/621,754 filed in the name of Kia Silverbrook on Mar. 22, 1996.

BACKGROUND OF THE INVENTION

1. Technical Field

This invention relates generally to the field of digitally controlled printing devices, and in particular to liquid ink drop-on-demand printheads which integrate multiple nozzles on a single substrate and in which a liquid drop is selected for printing by surface tension reduction techniques.

2. Background Art

Ink jet printing has become recognized as a prominent contender in the digitally controlled, electronic printing arena because, e.g., of its non-impact, low-noise characteristics, its use of plain paper and its avoidance of toner transfers and fixing. Ink jet printing mechanisms can be categorized as either continuous ink jet or drop-on-demand ink jet. U.S. Pat. No. 3,946,398, which issued to Kyser et al. in 1970, discloses a drop-on-demand ink jet printer which applies a high voltage to a piezoelectric crystal, causing the crystal to bend, applying pressure on an ink reservoir and letting drops on demand. Other types of piezoelectric drop-on-demand printers utilize piezoelectric crystals in push mode, shear mode, and squeeze mode. Piezoelectric drop-on-demand printers have achieved commercial success at image resolutions up to 720 dpi for home and office printers. However, piezoelectric printing mechanisms usually require complex high voltage drive circuitry and bulky piezoelectric crystal arrays, which are disadvantageous in regard to manufacturability and performance.

Great Britain Pat. No. 2,007,162, which issued to Endo et al. in 1979, discloses an electrothermal drop-on-demand ink jet printer which applies a power pulse to an electrothermal heater which is in thermal contact with water based ink in a nozzle. A small quantity of ink rapidly evaporates, forming a bubble which cause drops of ink to be ejected from small apertures along the edge of the heater substrate. This technology is known as Bubblejet™ (trademark of Canon K.K. of Japan).

U.S. Pat. No. 4,490,728, which issued to Vaught et al. in 1982, discloses an electrothermal drop ejection system which also operates by bubble formation to eject drops in a direction normal to the plane of the heater substrate. As used herein, the term "thermal ink jet" is used to refer to both this system and system commonly known as Bubblejet™.

Thermal ink jet printing typically requires approximately 20 µJ over a period of approximately 2 µs to eject each drop. The 10 Watt active power consumption of each heater is disadvantageous in itself; and also necessitates special inks, complicates the driver electronics, and precipitates deterioration of heater elements.

U.S. Pat. No. 4,275,290, which issued to Cielo et al., discloses a liquid ink printing system in which ink is supplied to a reservoir at a predetermined pressure and retained in orifices by surface tension until the surface tension is reduced by heat from an electrically energized resistive heater, which causes ink to issue from the orifice and to thereby contact a paper receiver. This system requires that the ink be designed so as to exhibit a change, preferably large, in surface tension with temperature.

U.S. Pat. No. 4,164,745, which also issued to Cielo et al., discloses a related liquid ink printing system in which ink is supplied to a reservoir at a predetermined pressure but does not issue from the orifice (or issues only slowly) due to a high ink viscosity. When ink is desired to be released (or when a greater amount of ink is desired to be released), the ink viscosity is reduced by heat from an electrically energized resistive heater, which causes ink to issue from the orifice and to thereby contact a paper receiver. This system requires that the ink be designed so as to exhibit a change, preferably large, in ink viscosity with temperature.

U.S. Pat. No. 4,166,277, which also issued to Cielo et al., discloses a related liquid ink printing system in which ink is supplied to a reservoir at a predetermined pressure and retained in orifices by surface tension. The surface tension is overcome by the electrostatic force produced by a voltage applied to one or more electrodes which lie in an array above the ink orifices, causing ink to be ejected from selected orifices and to contact a paper receiver. The extent of ejection is claimed to be very small in the above Cielo patents, as opposed to an "ink jet", contact with the paper being the primary means of printing an ink drop. This system is disadvantageous, in that a plurality of high voltages must be controlled and communicated to the electrode array. Also, the electric fields between neighboring electrodes interfere with one another. Further, the fields required are larger than desired to prevent arcing, and the variable characteristics of the paper receiver such as thickness or dampness can cause the applied field to vary.

In U.S. Pat. No. 4,293,865, which issued to Jinnai et al, a voltage applied to an electromechanical transducer in an ink channel below the ink orifice causes a meniscus to protrude but insufficiently to provide drop ejection. When, in addition, a voltage is applied to an opposing electrode above the ink orifice, ink from a protruding meniscus is caused by the electrostatic force to eject a drop of ink from the orifice which subsequently travels to a paper receiver. Ink from a meniscus not caused to protrude is not caused by the electrostatic force to be ejected. Various combinations of electromechanical transducers and electrostatic fields which act in combination to eject ink drops are similarly disclosed. This method is disadvantageous in that the fabrication of such transducer arrays is expensive and difficult.

In U.S. Pat. No. 4,751,531, which issued to Saito, a heater is located below the meniscus of ink contained between two opposing walls. The heater causes, in conjunction with an electrostatic field applied by an electrode located near the heater, the ejection of an ink drop. There are a plurality of heater/electrode pairs, but there is no orifice array. The force on the ink causing drop ejection is produced by the electric field, but this force is alone insufficient to cause drop ejection. That is, the heat from the heater is also required to reduce either the viscous drag and/or the surface tension of the ink in the vicinity of the heater before the electric field force is sufficient to cause drop ejection. The use of an electrostatic force alone requires high voltages. This system is thus disadvantageous in that a plurality of high voltages must be controlled and communicated to the electrode array. Also the lack of an orifice array reduces the density and controllability of ejected drops.

Other ink jet printing systems have also been described in technical literature, but are not currently used on a commercial basis. For example, U.S. Pat. Nos. 4,737,803 and 4,748,458 discloses ink jet recording systems wherein the coincident address of ink in print head nozzles with heat pulses and an electrostatically attractive field cause ejection of ink drops to a print sheet.

Each of the above-described ink jet printing systems has advantages and disadvantages. However, there remains a widely recognized need for an improved ink jet printing approach, providing advantages for example, as to cost, speed, quality, reliability, power usage, simplicity of construction and operation, durability and consumables.

Commonly assigned U.S. patent application Ser. No. 08/621,754 filed in the name of Kia Silverbrook on Mar. 22, 1996, discloses a liquid printing system that affords significant improvements toward overcoming the prior art problems associated with drop size and placement accuracy, attainable printing speeds, power usage, durability, thermal stresses, other printer performance characteristics, manufacturability, and characteristics of useful inks. One of the objects of the present invention is to further enhance these improvements to the prior art.

DISCLOSURE OF THE INVENTION

It is an object of the present invention to provide a drop-on-demand printhead wherein a mechanism of selecting drops to be printed produces a difference in position between selected drops and drops which are not selected, but which is insufficient to cause the selected ink drops to overcome the ink surface tension and separate from the body of the ink in the printhead, and wherein an additional means is provided to cause separation of the selected drops.

According to the present invention, the mechanism of producing a difference in position between selected drops and unselected drops is delivery of a surface tension reducing agent, such as a chemical surfactant, to the selected drops; said surface tension reducing agent being supplied separately from the ink.

A preferred aspect of this invention is that the means of separating the selected drops from the body of ink comprises electrostatic attraction of electrically conducting ink towards the recording medium.

An alternative preferred aspect of this invention is that the means of separating the selected drops from the body of ink comprises arranging the printing medium so that selected drops contact the printing medium and so that drops which are not selected do no contact the printing medium.

It is a feature of the present invention that the printhead does not require specially formulated inks having particular dependencies of viscosity and surface tension on temperature.

It is a further feature of this invention to provide a means of drop selection in such a printhead which dissipates a minimum of heat in the substrate on which the nozzles are fabricated.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

Figure 1:
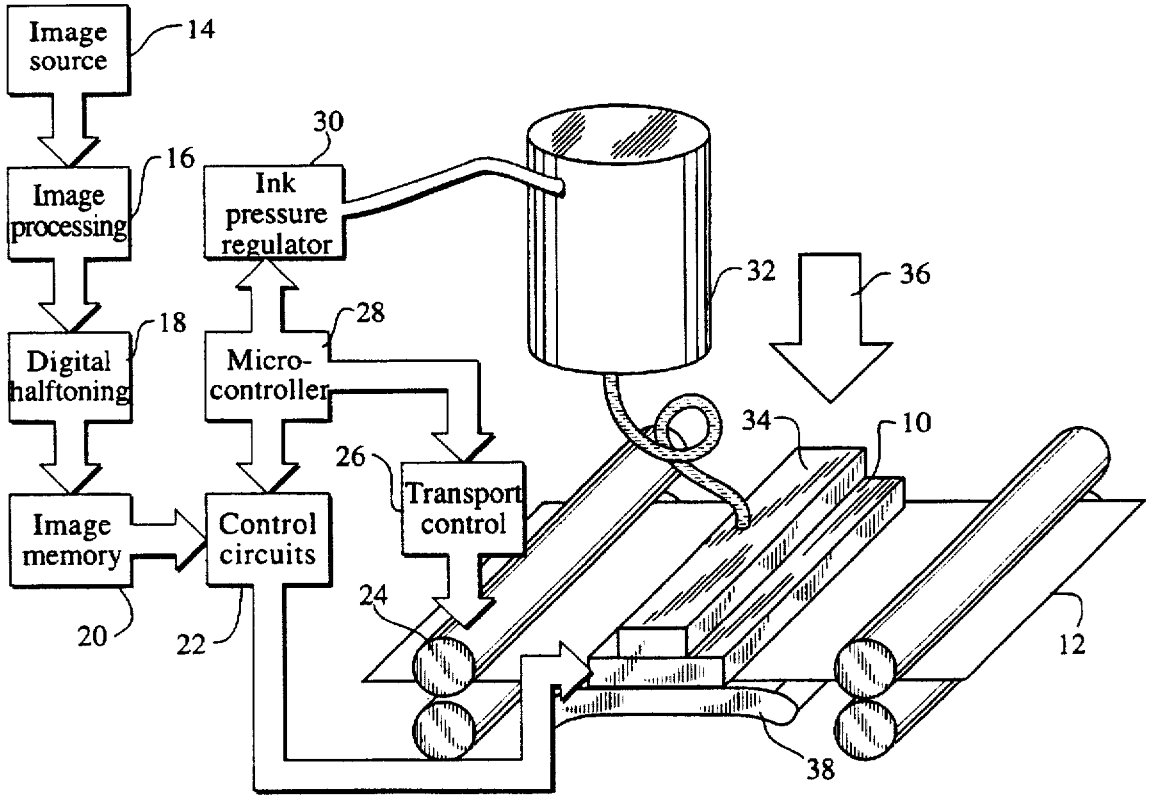
FIG. 1 is a simplified block schematic diagram of one exemplary printing apparatus according to the present invention.

The present description will be directed in particular to elements forming part of, or cooperating more directly with, apparatus in accordance with the present invention. It is to be understood that elements not specifically shown or described may take various forms well known to those skilled in the art.

One important feature of the present invention is a novel mechanism for significantly reducing the energy required to select which ink drops are to be printed. This is achieved by separating the mechanism for selecting ink drops from the mechanism for ensuring that selected drops separate from the body of ink and form dots on a recording medium. Only the drop selection mechanism must be driven by individual signals to each nozzle. The drop separation mechanism can be a field or condition applied simultaneously to all nozzles. The drop selection mechanism is only required to create sufficient change in the position of selected drops that the drop separation mechanism can discriminate between selected and unselected drops.

The following table entitled "Drop separation means" shows some of the possible methods for separating selected drops from the body of ink, and ensuring that the selected drops form dots on the printing medium. The drop separation means discriminates between selected drops and unselected drops to ensure that unselected drops do not form dots on the printing medium.

Drop separation means:

| Means | Advantage | Limitation |
|---|---|---|
| 1. Electrostatic attraction | Can print on rough surfaces, simple implementation | Requires high voltage power supply |
| 2. AC electric field | Higher field strength is possible than electrostatic, operating margins can be increased, ink pressure reduced, and dust accumulation is reduced | Requires high voltage AC power supply synchronized to drop ejection phase. Multiple drop phase operation is difficult |
| 3. Proximity (print head in close proximity to, but not touching, recording medium) | Very small spot sizes can be achieved. Very low power dissipation. High drop position accuracy | Requires print medium to be very close to print head surface, not suitable for rough print media, usually requires transfer roller or belt |
| 4. Transfer Proximity (print head is in close proximity to a | Very small spot sizes can be achieved, very low power dissipation, high accuracy, can print on | Not compact due to size of transfer roller or transfer belt. |

-continued

Drop separation means:

| Means | Advantage | Limitation |
|---|---|---|
| transfer roller or belt | rough paper | |
| 5. Proximity with oscillating ink pressure | Useful for hot melt inks using viscosity reduction drop selection method, reduces possibility of nozzle clogging, can use pigments instead of dyes | Requires print medium to be very close to print head surface, not suitable for rough print media. Requires ink pressure oscillation apparatus |
| 6. Magnetic attraction | Can print on rough surfaces. Low power if permanent magnets are used | Requires uniform high magnetic field strength, requires magnetic ink |

Other drop separation means may also be used. The preferred drop separation means depends upon the intended use. For most applications, method 1: "Electrostatic attraction", or method 2: "AC electric field" are most appropriate. For applications where smooth coated paper or film is used, and very high speed is not essential, method 3: "Proximity" may be appropriate. For high speed, high quality systems, method 4: "Transfer proximity" can be used. Method 6: "Magnetic attraction" is appropriate for portable printing systems where the print medium is too rough for proximity printing, and the high voltages required for electrostatic drop separation are undesirable. There is no clear 'best' drop separation means which is applicable to all circumstances.

A simplified schematic diagram of one preferred printing system according to the invention appears in FIG. 1. A printhead 10 and recording media 12 are associated with an image source 14, which may be raster image data from a scanner or computer, outline image data in the form of a page description language, or other forms of digital image representation. The image data is converted to a pixel-mapped page image by an image processing unit 16. This may be a raster image processor in the case of page description language image data, or may be pixel image manipulation in the case of raster image data. Continuous tone data produced by image processing unit 16 is halftoned by a digital halftoning unit 18. Halftoned bitmap image data is stored in a full page or band image memory 20. Control circuits 22 read data from image memory 20 and apply time-varying electrical pulses to selected nozzles that are part of printhead 10. These pulses are applied at an appropriate time, and to the appropriate nozzle, so that selected drops will form spots on recording medium 12 in the appropriate position designated by the data in image memory 20.

Recording medium 12 is moved relative to printhead 10 by a media transport system 24, which is electronically controlled by a media transport control system 26, which in turn is controlled by a microcontroller 28. In the case of pagewidth printheads, it is most convenient to move recording media 12 past a stationary printhead. However, in the case of scanning print systems, it is usually most convenient to move the printhead along one axis (the sub-scanning direction) and the recording medium along the orthogonal axis (the main scanning direction), in a relative raster motion. Microcontroller 28 may also control an ink pressure regulator 30 and control circuits 22.

Ink is contained in an ink reservoir 32 under pressure. In the quiescent state (with no ink drop ejected), the ink pressure is insufficient to overcome the ink surface tension and eject a drop. A constant ink pressure can be achieved by applying pressure to ink reservoir 32 under the control of ink pressure regulator 30. Alternatively, for larger printing systems, the ink pressure can be very accurately generated and controlled by situating the top surface of the ink in reservoir 32 an appropriate distance above printhead 10. This ink level can be regulated by a simple float valve (not shown).

Ink is distributed to the back surface of printhead 10 by an ink channel device 34. The ink preferably flows through slots and/or holes etched through a silicon substrate of the printhead to the front surface, where the nozzles and actuators are situated.

In some types of printers according to the invention, an external field 36 is required to ensure that the selected drop separates from the body of the ink and moves towards recording medium 12. A convenient external field 36 is a constant electric field, as the ink is easily made to be electrically conductive. In this case, a paper guide (or platen) 38 can be made of electrically conductive material and used as one electrode generating the electric field. The other electrode can be printhead 10 itself. Another embodiment uses proximity of the print medium as a means of discriminating between selected drops and unselected drops.

For small drop sizes, gravitational force on the ink drop is very small; approximately $10^{-4}$ of the surface tension forces. Thus, gravity can be ignored in most cases. This allows printhead 10 and recording medium 12 to be oriented in any direction in relation to the local gravitational field. This is an important requirement for portable printers. When properly arranged with the drop separation means, selected drops proceed to form spots on recording medium 12, while unselected drops remain part of the body of ink.

Figure 2A:
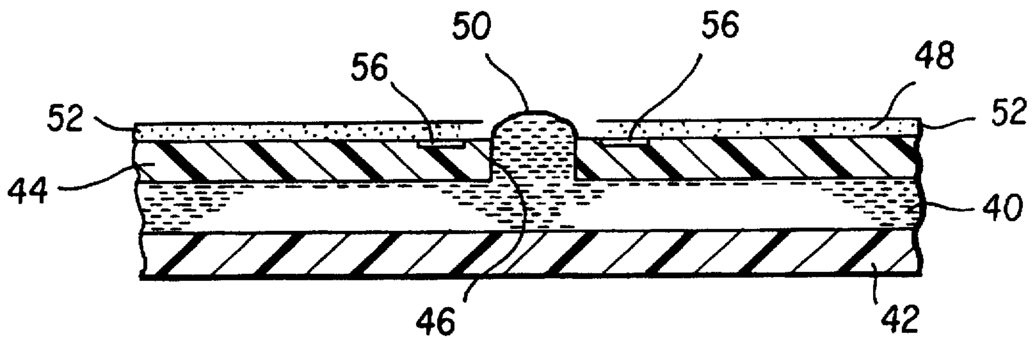
FIGS. 2A and 2B are cross-sectional views of a drop-on-demand ink jet printhead according to a preferred embodiment of the present invention.
Figure 2B:
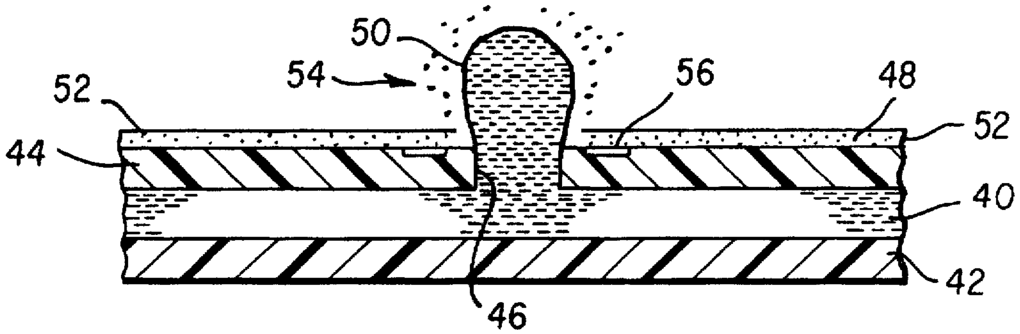

FIGS. 2A and 2B show cross-sectional views of a drop-on-demand ink jet printhead 10 according to a preferred embodiment of the present invention. An ink delivery channel 40 is formed (as explained in full below) between a substrate 42 and an orifice plate 44. Orifice plate 44 has a plurality of orifices 46 through which ink may pass from ink delivery channel 40. Orifices 46 are also known as nozzles, and may extend above the top of the orifice plate if desired. A channel 48 opens adjacent to orifice 46.

An ink meniscus 50 is shown in FIG. 2A before selection; and, in FIG. 2B, a protruding ink meniscus 50 is shown after selection for printing. Ink in delivery channel 40 is at all times pressurized above atmospheric pressure, and ink meniscus 50 therefore protrudes somewhat above orifice plate 44 at all times, the force of surface tension, which tends to hold the drop in, balancing the force of the ink pressure, which tends to push the drop out.

Drop selection in accordance with the present invention is accomplished by physical deposition of a surface tension reducing agent, such as a surfactant vapor 54 (FIG. 2B), onto ink meniscus 50 of FIG. 2A. This deposition is achieved using a separate surfactant channel(s) 48 for each orifice 46. Molecules evaporated from surfactant 52 in channel(s) 48 near surfactant heater(s) 56 travel to ink meniscus 50 as a vapor, and condense on the ink meniscus. In FIGS. 2A and 2B a surfactant channel and associated surfactant heater are shown on both the left and right side of ink meniscus 50. The surfactant molecules so deposited on meniscus 50 alter the balance of the forces of surface tension, which tends to hold the drop in, and ink pressure, which tends to push the drop out; and the ink meniscus protrudes further from orifice 46. The drop is said at this stage to be "selected" for printing, with protruding ink meniscus 50, as shown in FIG. 2B.

Advantageously, no heat need be transferred to the ink in accordance with the present invention, nor is the supply of surfactant in anyway governed by or limited by the chemical properties of the ink. The surfactant 52 consumed is replenished through surfactant channel 48, fed from surfactant in an external reservoir, to be discussed, in a mariner similar to the provision of ink to orifice 46 through ink delivery channel.

When it is desired to cause a drop of ink to be expelled from the orifice and to be printed onto a print region such as a sheet of paper, not shown, surfactant heater 56 is activated, thereby causing a surfactant vapor 54 to form. Condensation of the vapor onto the ink meniscus produces an alteration of the surface tension of the ink. In this, ink need not exhibit a reduction of surface tension upon heating nor is the time scale of surfactant delivery to meniscus 50 governed by the properties of the ink.

Reduction of the surface tension of the meniscus by the condensed surfactant alters the balance of the forces of surface tension and ink pressure, and causes the meniscus to protrude further from the orifice, as depicted in FIG. 2B; which shows the position of ink meniscus 50 shortly after the heater has been activated but before a drop has separated from the ink remaining in orifice 46. Such a protruding ink meniscus is said to be a selected drop.

The change in surface tension produced by the device of the present invention due to the addition of a surface tension reducing agent may not be alone sufficient to cause the selected drop to separate from the ink remaining in orifice 46 or to be transported to a print region; and, in this case, an external force or condition such as an electric field is applied at all times to assist the separation of the drop from the ink remaining in the orifice, such field being insufficient to cause a drop to separate in the case of a drop not selected. The electric field in this case may also assist the transport of separated drops to a print region, not shown.

Method of Manufacture

Figure 3A:
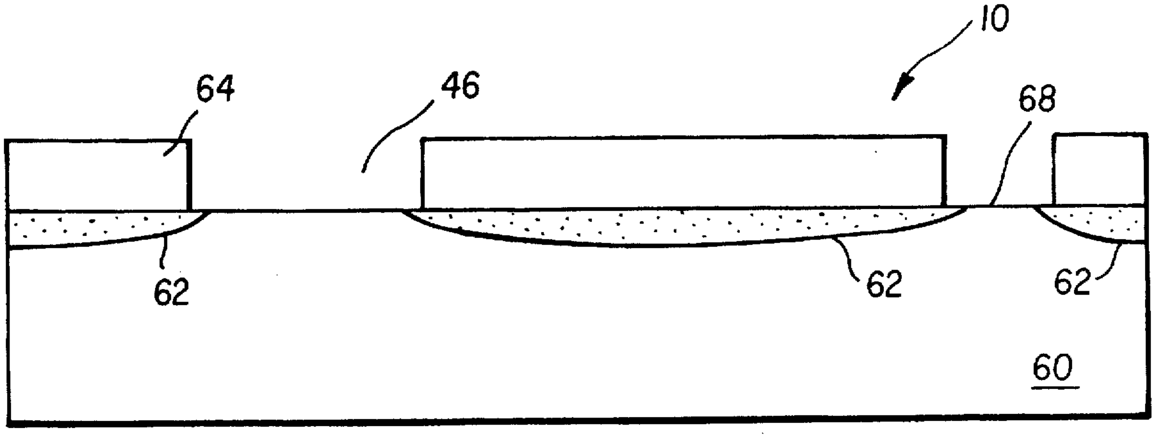
FIGS. 3A through 3P are top plan views of a printhead according to the present invention showing steps of a preferred method of manufacture.

The ink jet device described in FIGS. 2A and 2B may be advantageously manufactured by processes related to those used to process semiconductor devices, namely thin film deposition, photolithography, etching, planarization, and annealing. A preferred method of manufacture is now described in FIGS. 3A through 3P. Referring to FIG. 3A, semiconductor substrate 60 for printhead 10, preferably lightly doped p-type or n-type silicon, is shown implanted at regions 62 with boron ions at a dose preferably greater than 5E16 ions per square centimeter and annealed at a temperature of between 900° C. and 1200° C. for a period of time sufficient to cause boron ion diffusion to a depth of greater than five microns. As is well known in the art, a time of four hours at a temperature of 1200° C. is sufficient to diffuse ions to a depth greater than five microns. The spatial distribution of ions shown in FIG. 3A is achieved by patterning a photoresist layer 64 in those regions from which ion deposition is desired to be excluded, namely in ink orifice 46 and surfactant channel connection 68, as is customarily practiced in the art of selective semiconductor doping. Boron doped regions 62 are shown in FIGS. 3A and 3B and are understood to be present, although not shown, in subsequent figures, until FIG. 3O, in which boron doped regions 62 are again shown.

It may be advantageous in some applications that semiconductor substrate 60 have active electrical circuits, for example CMOS circuits, fabricated on it in regions (not shown) largely removed from the locations of the ink jet device prior to the steps of forming the ink jet device. In this manner, ink jet electrical elements achieved in accordance with the present invention, such as resistance heaters to be described, can be connected integrally to and controlled by this circuitry so as to minimize the number of wirebonds to separate semiconductor chips.

Figure 3B:
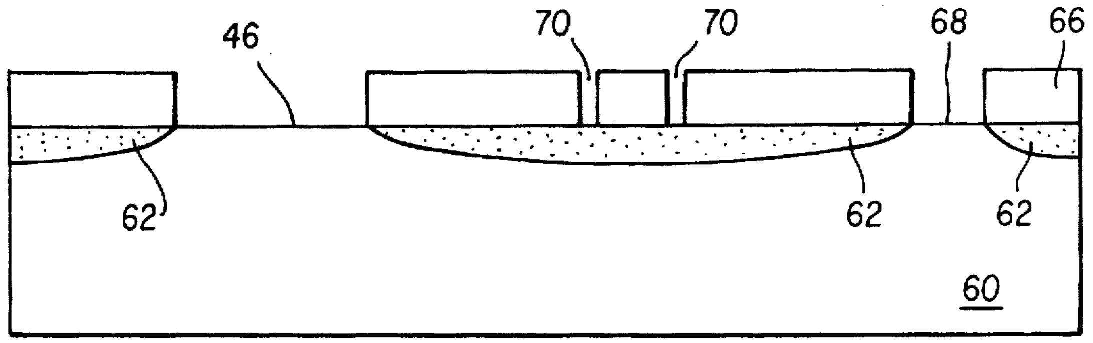

Next, as shown in FIG. 3B, the photoresist is removed and a dielectric 66, preferably an oxide deposited by plasma enhanced CVD, is deposited uniformly in a layer of thickness in the range of from 0.3 microns to 3.0 microns. Dielectric 66 is then patterned by conventional lithography and etching, preferably by reactive ion etching using CHF3 gas, resulting in substantially vertical walls in ink orifice 46, surfactant channel connection 68, and heater lead opening 70. Ink orifice 46 and surfactant channel connection 68 are defined so as to be symmetrically disposed to boron doped regions 62, and heater lead opening 70 is patterned with its ends close to ink orifice 46 at a precise distance form ink orifice 46. An important feature of this method of fabrication is that the separation of a heater to be formed (FIG. 3G) from ink orifice 46 is determined at a single mask level and is not subject to fluctuations due to mask to mask misalignments.

Figure 3C:
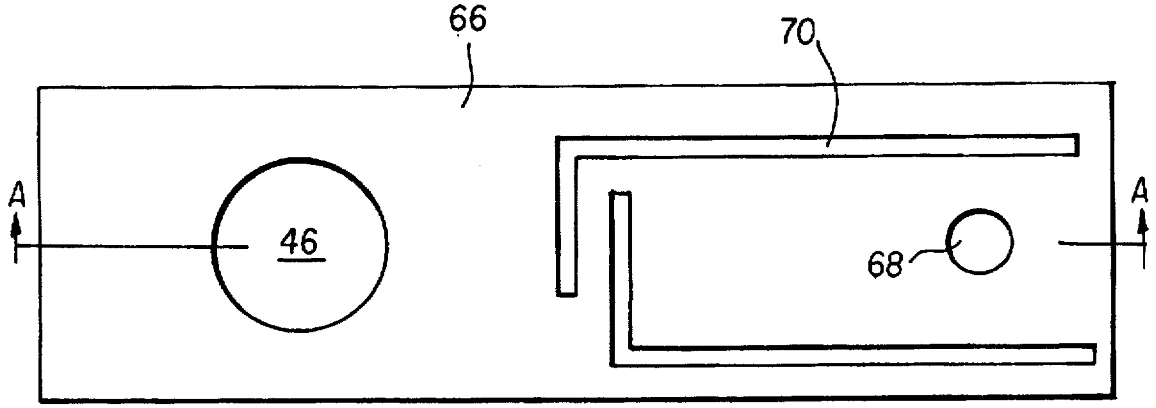

FIG. 3C shows a plan view of the device at this stage of fabrication. It is to be understood that the heater lead openings 70 may continue to locations not shown in order that the heater leads can connect to CMOS switching components that are fabricated in semiconductor substrate 60 remote from the vicinity of the ink jet device whose fabrication is described here.

It is next desired to fill the openings in dielectric 66 with a conductive material 74, preferably a metal from the group aluminum, titanium, tungsten, copper, and silicides or alloys thereof, in order to define conductive regions 76 that have substantially less electrical resistance than that of the heater to be formed. The resistivity of such materials is preferably less than 10 milliohm-cm in order that little heat is dissipated in the heater leads when current is conducted.

Figure 3D:
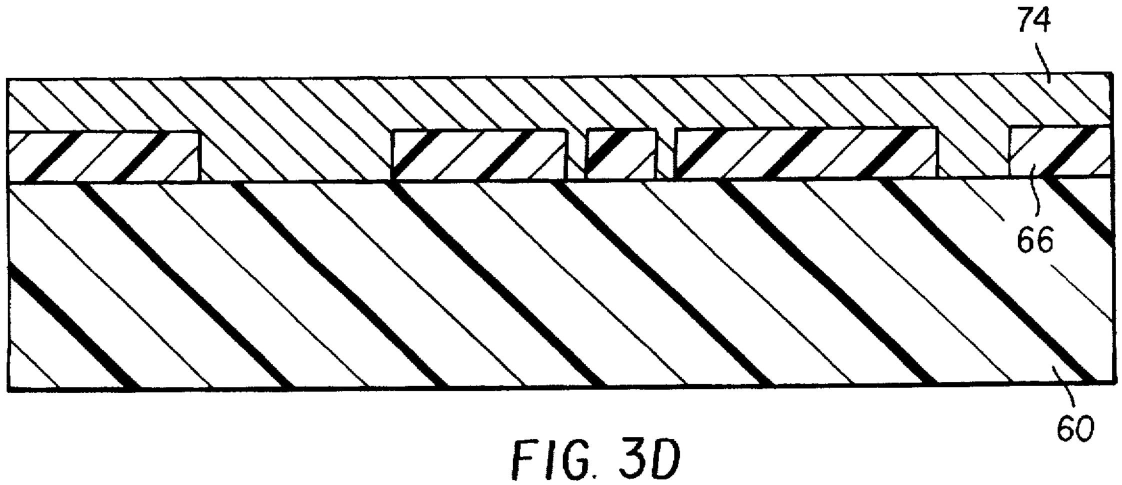
Figure 3E:
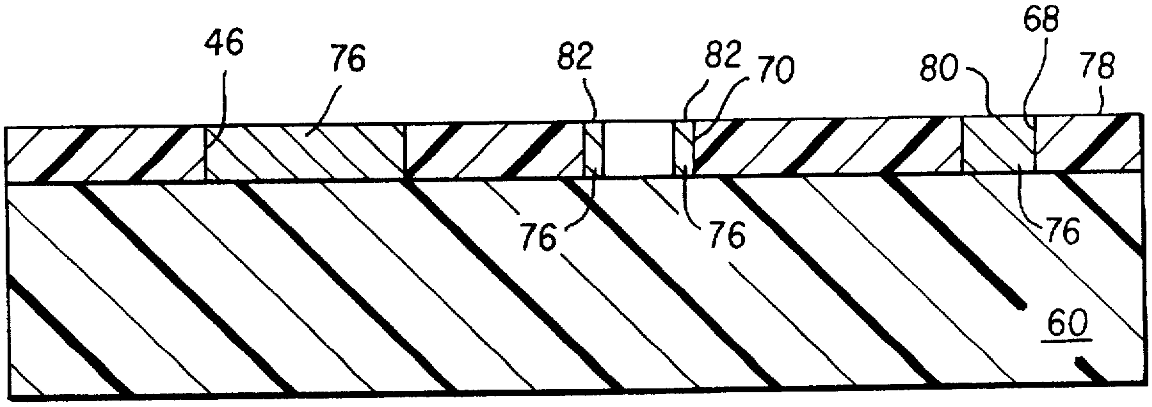

FIG. 3D shows the device in cross-section A—A given in plan view FIG. 3C after uniform deposition of a conductive material 74 whose thickness is preferably greater than the thickness of dielectric 66, for example 3 microns. Conductive material 74 is next patterned by global planarization (FIG. 3E) to the extent that it is removed entirely from over surface 78 of dielectric 66, preferably by chemical mechanical polishing, forming thereby electrically isolated conductive regions 76 with surfaces 80 coplanar to surface 78. The conductive regions 76 in heater lead openings 70 comprise heater leads 82 which will remain in place to conduct electricity to heaters 56 (to be formed), whereas conductive regions 76 in ink orifice 46 and in surfactant channel connection 68 will later be removed, serving temporarily as sacrificial planarizing agents.

Figure 3F:
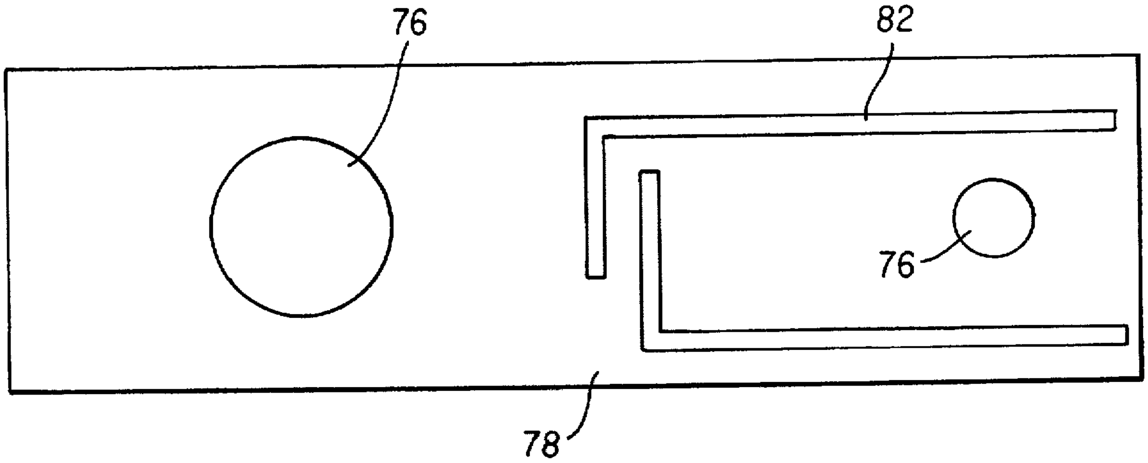

FIG. 3F shows a plan view of the device at this stage of fabrication. It is to be understood that heater leads 82 may be routed to locations not shown in order that they can connect to CMOS switching components fabricated in semiconductor substrate 60 remote from the vicinity of the ink jet device.

Figure 3G:
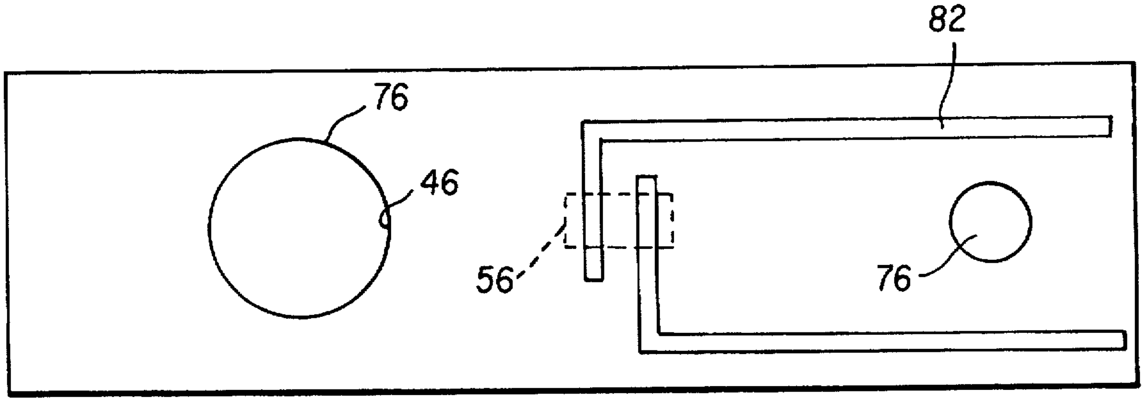

FIG. 3G shows a heater 56, which covers part of the region between the portions of the heater leads 82 near ink orifice 46 and which is in electrical contact with heater leads 82. The heater 56 is preferably provided by first depositing uniformly a thin film of heater material, for example indium tin oxide, having a resistivity about 10 times to 1000 times the resistivity of heater leads 82. Other materials are readily available, for example preferred heater materials also include but are not restricted to thin films of tungsten, tantalum, or doped polysilicon, in the thickness range of from 500 A to 1 micron. The uniformly deposited heater material is then defined into a rectangle as shown in FIG. 3G by conventional photolithography and ion milling or reactive ion etching. The resistance desired for heater 56 depends on both the heater material, the temperature desired to be achieved, and the available drive current and voltage which may be provided by integral CMOS circuitry on substrate 60. A preferred range of values for the resistance of heater 56 is from 10 ohms to 500 ohms.

Figure 3H:
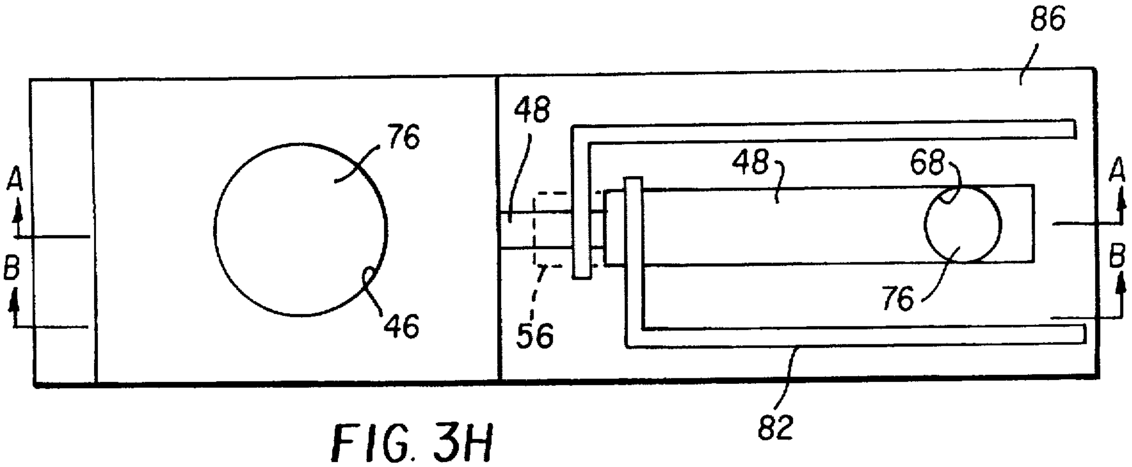
Figure 3I:
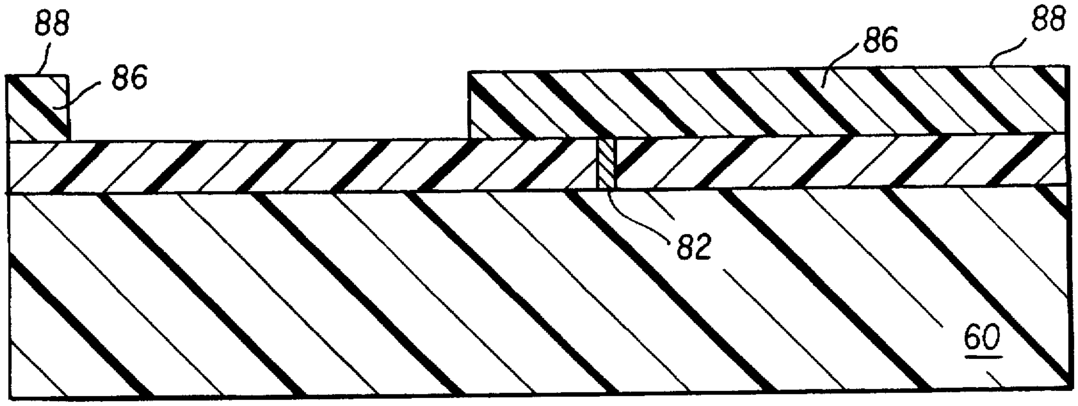
Figure 3J:
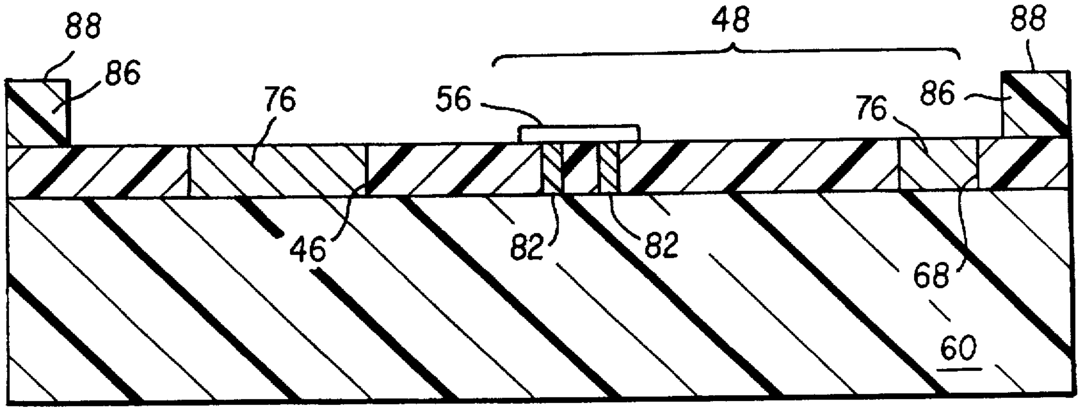

It is next desired to form a surfactant channel 48 (FIG. 3H through FIG. 3J) near the ink orifice 46 in order to provide a supply of surfactant to ink orifice 46. FIG. 3H shows a plan view of a preferred method for providing surfactant channel 48, namely by the steps of first depositing a channel dielectric 86, preferably a polyimide applied by spin-on coating or multiple spin-on coatings, of thickness in the range of from 1 micron to 3 microns but not restricted to that range, and then patterning channel dielectric 86 by conventional lithography followed by reactive ion etching using oxygen gas. For thicknesses in the upper preferred range, the use of an intermediate metallic mask is advisable, as is well known in the art of thin film processing. The deposition and patterning of channel dielectric 86 is facilitated by the fact that the surfaces 80 and 78 (FIG. 3E) are coplanar, and thus the surface 88 (Fig. I) of channel dielectric 86 is also substantially planar. The pattern of surfactant channel 48 as shown in FIG. 3H is narrow at the end of the channel closest to the ink orifice 46, the transition from a wide to a narrow channel serving to define the location of a meniscus of liquid surfactant supplied to the channel during device operation to be over heater 56, as is well known in the art of fluid dynamics. FIGS. 3I and 3J show the device at this stage of fabrication in cross-sectional views B—B and A—A, respectively, from the device plan view, FIG. 3H.

Figure 3K:
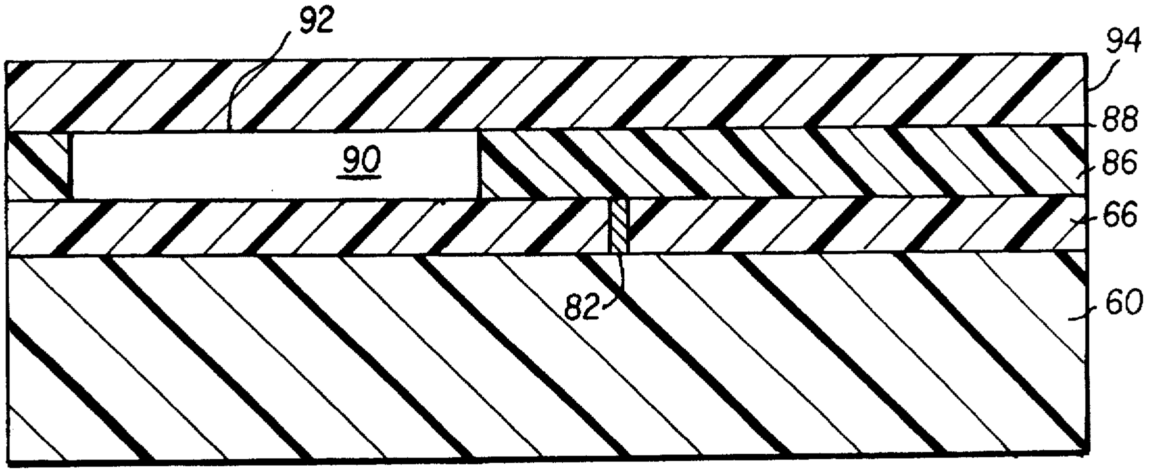
Figure 3L:
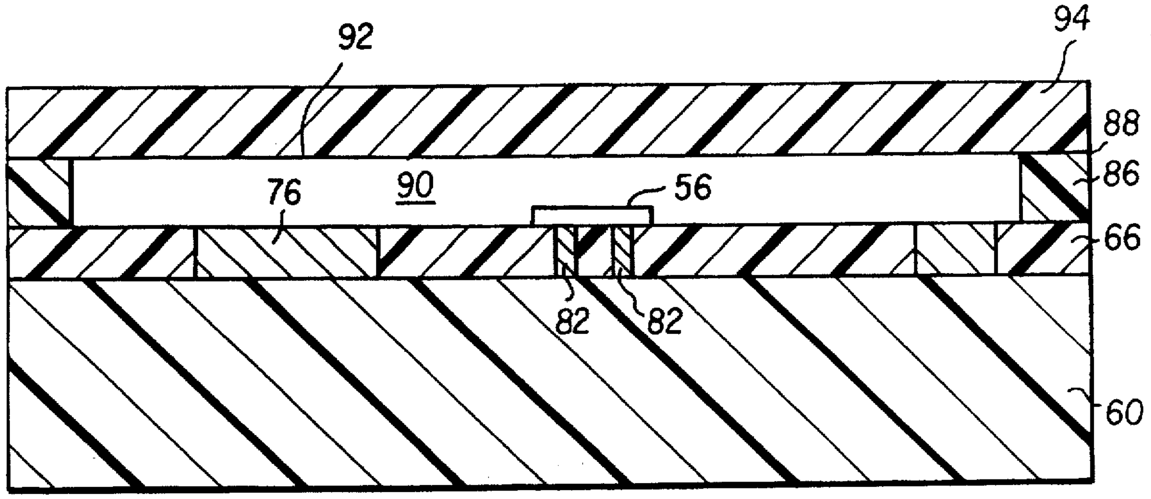

Next, FIG. 3K, a sacrificial material 90, preferably a material such as photoresist or polymethyl methracrylate which may be dissolved in common chemical solvents, is provided to fill surfactant channel 48 and other regions in which the channel dielectric 86 was etched. The location of sacrificial material 90 is depicted in FIG. 3K and FIG. 3L, which show the device in cross-sections B—B and A—A, respectively, from plan view, FIG. 3H. Dicing protection materials commonly used in silicon device packaging technology also may be used for this purpose. Sacrificial material 90 is deposited uniformly for example by spin-on coating, and is then etched back so as to be removed entirely from the surface 88 of channel dielectric 86. Surface 92 of the remaining portions of sacrificial material 90 is substantially coplanar with surface 88 of channel dielectric 86. Surfaces 88 and 92 provide a support for the application a subsequent layer, top plate 94.

Figure 3M:
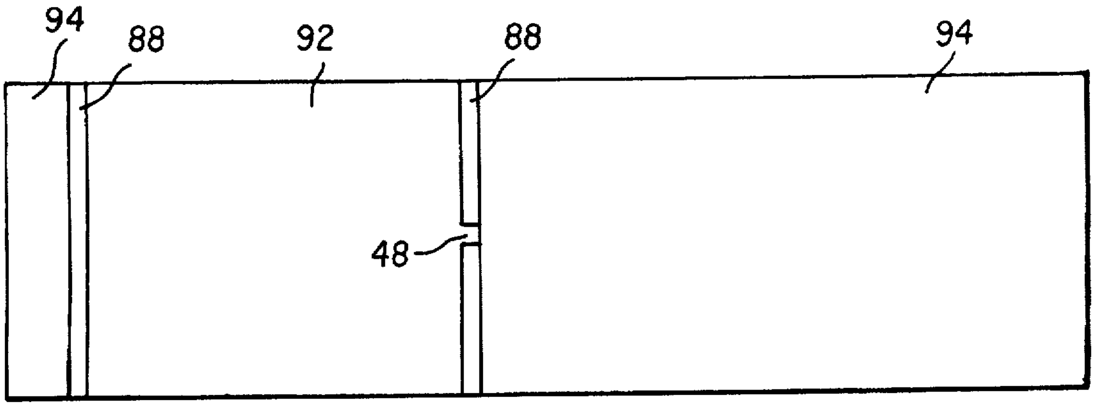
Figure 3N:
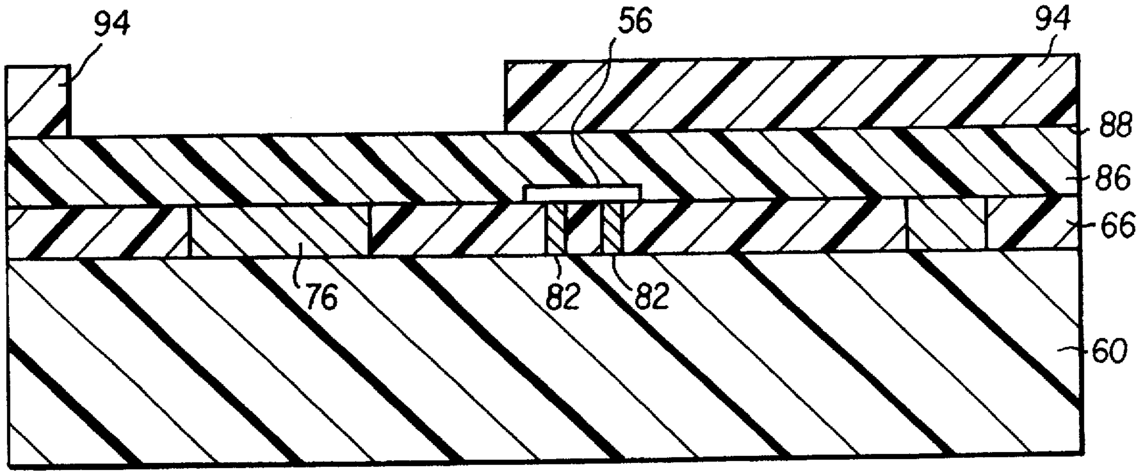

Top plate 94, preferable also a polyimide, is then deposited uniformly as shown also in FIGS. 3K and 3L on surfaces 88 and 92 to form the top of surfactant channel 48. Top plate 94 is subsequently patterned to remove it from around ink orifice 46, as shown in FIG. 3M, thereby exposing the end of surfactant channel 48 near ink orifice 46. Patterning of this layer by conventional lithography using an intermediate metallic mask (not shown) is advantageous to avoid degradation of the mask, as is well known in the art of thin film processing. The etch used to pattern top plate 94, preferably an oxygen based reactive ion etch, can alternately be extended through sacrificial material 90 and channel dielectric 86 stopping on dielectric 66, thereby advantageously rendering the walls of the ends of the surfactant channel 48 vertically self-aligned. FIG. 3N shows the device in cross-sectional view A—A, from the plan view, FIG. 3H.

Figure 3O:
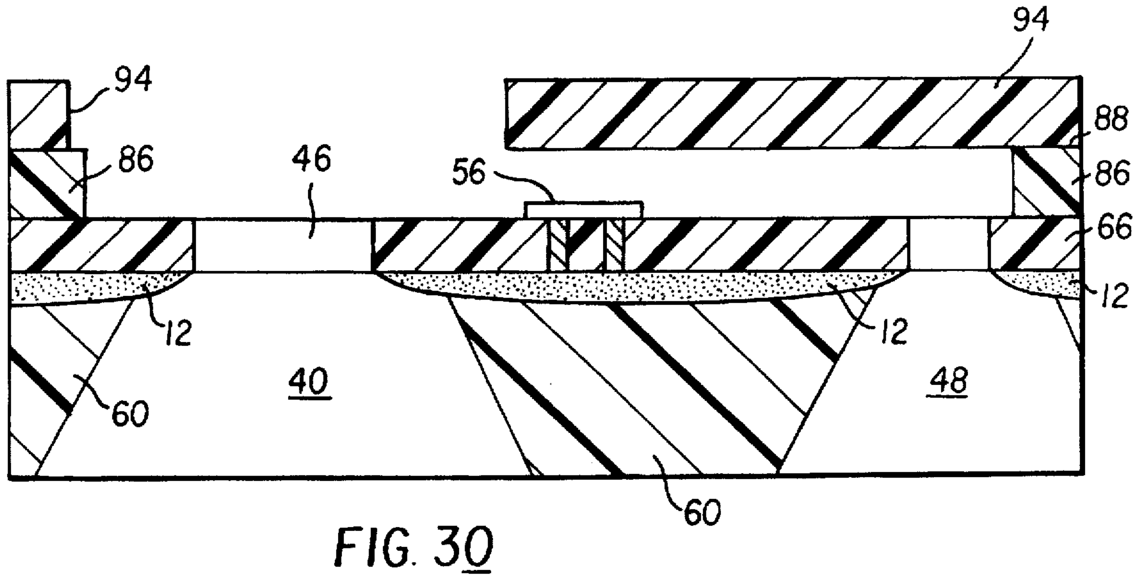

It is now required to form substrate ink channel 40 and substrate surfactant channel 48 in semiconductor substrate 60 by etching from the backside of semiconductor substrate 60 using a crystallographic etch, for example KOH, which defines ink channels with an angled sidewall geometry, as shown in FIG. 3O for the case that semiconductor substrate 60 is silicon. The angled geometry of substrate ink channel 40 and substrate surfactant channel 48 is due to the fact that the etch stops at surface 92, as is well known in the art of silicon processing. It is advantageous also that this etch stops in boron doped regions 62, as is well known in the art, as shown in FIG. 3O, so as to form an underlying support for dielectric 66 in the vicinity of ink orifice 46 and surfactant channel connection 68, also shown in FIG. 3O. It is additionally advantageous that the KOH etch removes the conductive material 74 from conductive regions 76 where it comes in contact with such regions, namely at ink orifice 46 and surfactant channel connection 68. The KOH etch stops at sacrificial material 90 and is thereby prevented from coming in contact with heater 56 and heater leads 82. It may be advantageous prior to etching ink channels 40 and substrate surfactant channel 48 to coat the entire top of the device with a sacrificial protective material, such as the materials used for dicing protection in semiconductor packaging, to prevent the etchant from contacting the device front surface.

Figure 3P:
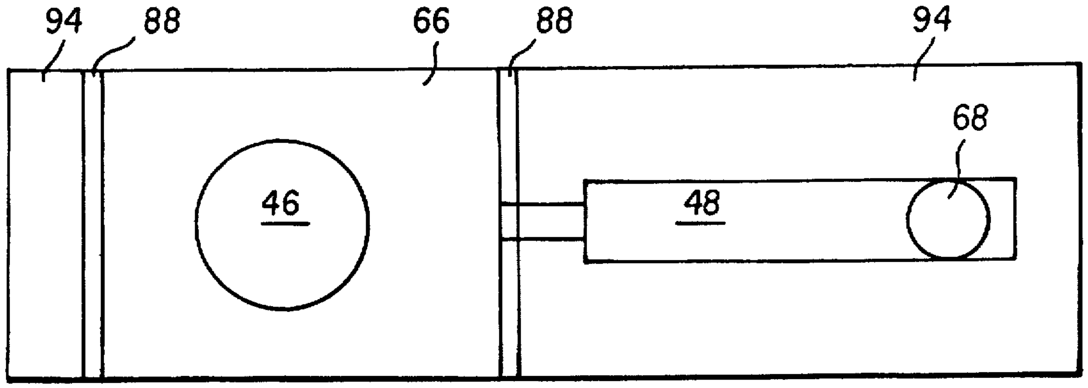

Following definition of substrate ink channel 40 and substrate surfactant channel 48, sacrificial material 90 and any additional sacrificial protective material used during the etch of the semiconductor substrate 60 are removed by dissolution in organic solvents. In particular, sacrificial material 90 is removed from within surfactant channel 48. The essential parts of the ink jet device are now complete. FIG. 3P shows a plan view of the completed ink jet device with shaded regions indication the locations of substrate ink channel 40 and substrate surfactant channel 48, although it is understood that the surfactant channel would not be visible in a true device plan view at this stage of fabrication, being covered by top plate 94.

Figure 4:
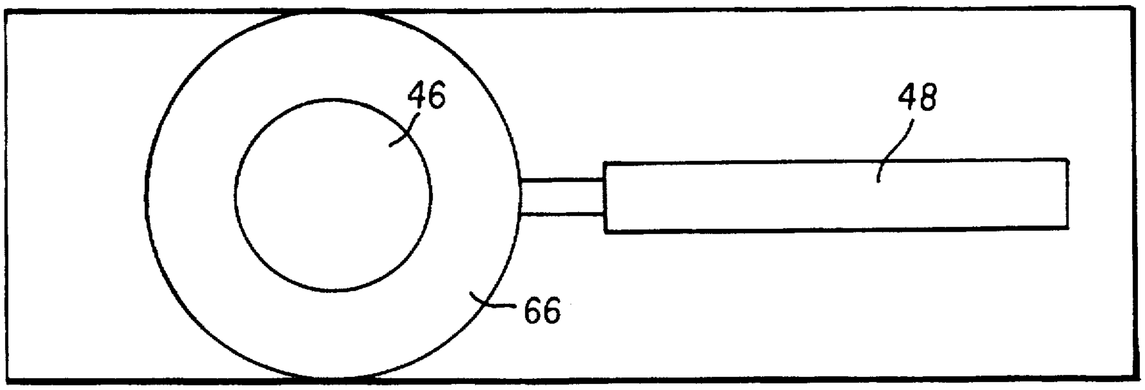
FIG. 4 is a top plan view of another embodiment of a printhead according to the present invention.
Figure 5:
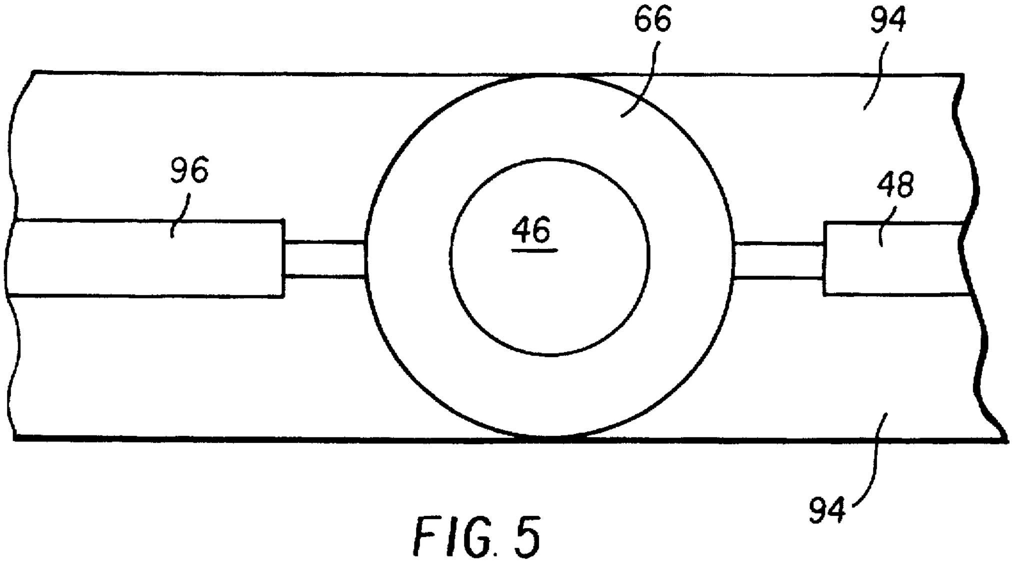
FIG. 5 is a top plan view of yet another embodiment of a printhead according to the present invention.

Many variations of the device and method of fabrication described in the preferred embodiment are possible and would be apparent to those skilled in the art of thin film processing. For example, variations include but are not limited to variations in the shape of substrate ink channel 40. For example, substrate ink channel 40 may extend only part way into the substrate as in FIG. 2 or through the substrate as in FIG. 3O. Variations also include the shape and position of the surrounding region around ink orifice 46 from which the top plate 94 and channel dielectric 86 have been removed from dielectric 66. Such a variation is shown in FIG. 4, in which the region surrounding orifice 46 has been made circular in order to symmetrically confine surfactant vapor 54. A related embodiment is shown in FIG. 5, in which the surrounding region has been made circular in order to symmetrically confine surfactant vapor 54 and in which a second surfactant channel 96 and heater has been positioned 180 degrees from the original surfactant channel 48 in order to increase the amount of surfactant vapor 54 provided to meniscus 50 and to increase the symmetry of surfactant vapor delivery.

Figure 6A:
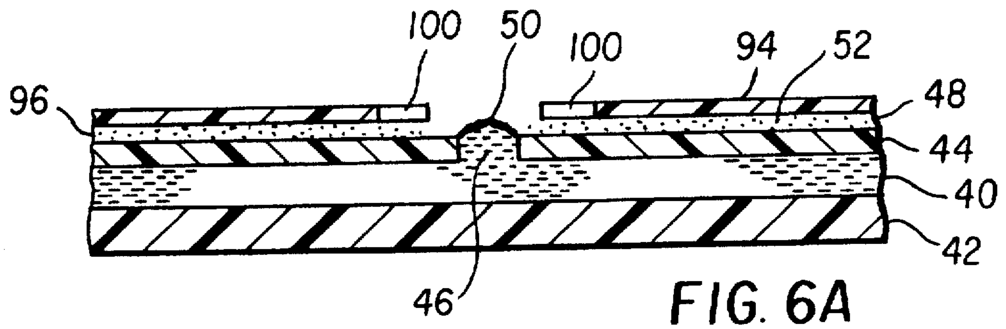
FIGS. 6A and 6B are cross-sectional views of a drop-on-demand ink jet printhead according to another preferred embodiment of the present invention.
Figure 6B:
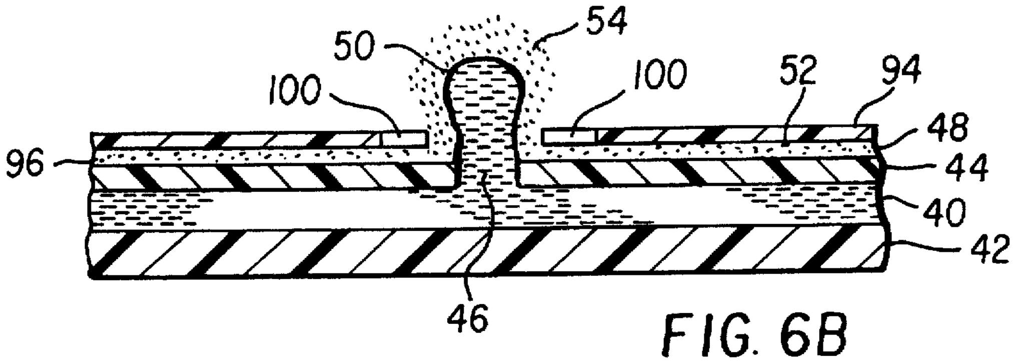

Other variations also include changes in the location of heater 56 but still providing thermal coupling of heater 56 to a surfactant channel or channels, such as surfactant channel 48 and second surfactant channel 96. FIG. 6A and FIG. 6B show such an alternative heater 100, located at the top of surfactant channels 48 and 96, both before (FIG. 6A) and after (FIG. 6B) drop selection.

Figure 7A:
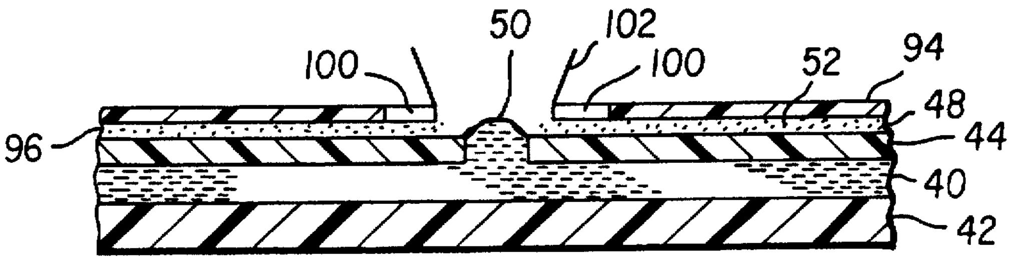
FIGS. 7A and 7B are cross-sectional views of a drop-on-demand ink jet printhead according to yet another preferred embodiment of the present invention.
Figure 7B:
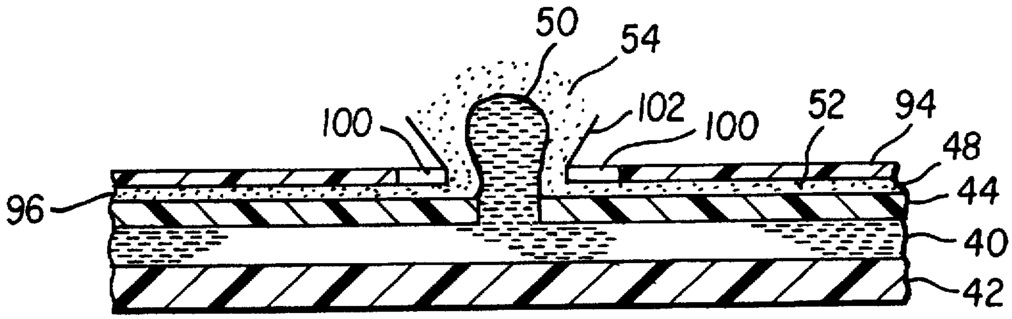

Other device embodiments within the teaching of this invention also include the fabrication of walls 102 surrounding ink orifice 46, as shown in FIGS. 7A and 7B, to confine the spread of surfactant vapor 54, in particular to reduce the spread of surfactant vapor between adjacent orifices 46 in printheads having multiple orifices. FIG. 7A and FIG. 7B show sloping walls, both before (FIG. 7A) and after (FIG. 7B) drop selection.

Other variations also include changes in the location of heater 56 to increase the efficiency of heat transfer between heater 56 and surfactant 52. In this case, heater 56 is positioned centrally in surfactant channel 48, so that surfactant 52 contacts heater 56 on both the top and bottom side.

It is to be appreciated that although a particular preferred embodiment of the method of manufacture of the device of the present invention has been described in detail, many variations of this method are possible and would be apparent to those skilled in the art of thin film processing. Likewise, many variations of the device geometry are possible consistent with the nature of the nature and principal of operation of the present device, such variants being within the scope and practice of the present invention.

Parts List

| | | | |
|---|---|---|---|
| 10 | printhead | 56 | surfactant heater |
| 12 | recording media | 58 | |
| 14 | image source | 60 | semiconductor substrate |
| 16 | image processing unit | 62 | boron ion implant regions |
| 18 | digital halftoning unit | 64 | photoresist layer |
| 20 | image memory | 66 | dielectric |
| 22 | control circuits | 68 | surfactant channel connection |
| 24 | media transport system | 70 | heater lead opening |
| 26 | media transport control system | 72 | |
| 28 | microcontroller | 74 | conductive material |
| 30 | ink pressure regulator | 76 | conductive regions |
| 32 | ink reservoir | 78 | surface |
| 34 | Ink channel device | 80 | surface |
| 36 | external field | 82 | heater leads |
| 38 | platen | 84 | |
| 40 | substrate ink channel | 86 | channel dielectric |
| 42 | substrate | 88 | surface |
| 44 | orifice plate | 90 | sacrificial material |
| 46 | substrate orifice | 92 | surface |
| 48 | substrate surfactant channel | 94 | top plate |
| 50 | ink meniscus | 96 | second surfactant channel |
| 52 | surfactant | 98 | |
| 54 | surfactant vapor | | |
| 100 | heater | 150 | |
| 102 | walls | 152 | |
| 104 | | 154 | |
| 106 | heater | 156 | |
| 108 | | 158 | |
| 110 | | 160 | |
| 112 | | 162 | |
| 114 | | 164 | |
| 116 | | 166 | |
| 118 | | 168 | |
| 120 | | 170 | |
| 122 | | 172 | |
| 124 | | 174 | |
| 126 | | 176 | |
| 128 | | 178 | |
| 130 | | 180 | |
| 132 | | 182 | |
| 134 | | 184 | |
| 136 | | 186 | |
| 138 | | 188 | |
| 140 | | 190 | |
| 142 | | 192 | |
| 144 | | 194 | |
| 146 | | 196 | |
| 148 | | 198 | |

What is claimed is:

1. An ink jet printhead for drop-on-demand printing, said printhead comprising:

(a) a substrate having a plurality of drop-emitter orifices;

(b) an ink channel coupled to each of said orifices for delivery of a body of ink to the orifices;

(c) pressure means for subjecting ink in said channels to a pressure above ambient pressure;

(d) a supply of surface tension reducing agent which is separate from the body of ink; and (e) drop selection means for selectively delivering a surface tension reducing agent from said supply to ink which has been delivered to selectively addressed ones of the orifices, thereby causing a difference in meniscus position between ink in addressed and non-addressed orifices.

2. The printhead of claim 1 further including drop separating means for causing ink from addressed orifices to separate as drops from the body of ink while allowing ink to be retained in non-addressed orifices.

3. The printhead of claim 2 wherein:

said selection means causes ink in addressed orifices to move to selected positions, retained by surface tension, but further protruding from the orifices than ink in non-addressed orifices; and said drop separating means attracts such further-protruding ink toward a print region.

4. The printhead of claim 1 in which said surface tension reducing agent is a chemical surfactant.

5. The printhead of claim 4 further including drop separating means for causing ink from addressed orifices to separate as drops from the body of ink while allowing ink to be retained in non-addressed orifices.

6. The printhead of claim 5 wherein:

said selection means causes ink in addressed orifices to move to selected positions, retained by surface tension, but further protruding from the orifices than ink in non-addressed orifices; and said drop separating means attracts such further-protruding ink toward a print region.

7. The printhead of claim 4 in which said selection means is vapor deposition of surfactant onto the ink delivered to the orifices.

8. The printhead of claim 6 in which the vapor deposition of surfactant is provided by thermal vaporization of a liquid surfactant.

9. The printhead of claim 8 wherein:

the selection means comprises an electrical resistor; and vaporization of the surfactant is produced by current flow through the resistor.

10. The printhead of claim 9 wherein:

the substrate is a silicon wafer; and the current is provided by monolithically integrated circuits on the silicon wafer.

11. The printhead of claim 6 wherein the orifices are each formed of an extended nozzle aperture to confine the vapor.

12. The printhead of claim 8 in which vaporization of the surfactant is produced by current flow through the liquid surfactant to an integrally provided grid.

13. The printhead of claim 1 in which the ink is a pigmented ink.

14. The printhead of claim 1 in which the ink is a magnetic ink.

15. The printhead of claim 1 in which the ink is an emulsion ink.

16. The printhead of claim 1 in which the ink is a microemulsion ink.

* * * * *